(12) United States Patent
Yamano

(10) Patent No.: US 6,314,088 B1
(45) Date of Patent: Nov. 6, 2001

(54) NODE CONFIGURATION SETUP SYSTEM WITH SERVERS HUNTING THROUGH CONNECTION-ORIENTED NETWORK FOR CLIENT'S DATA

(75) Inventor: Shigeki Yamano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/933,927

(22) Filed: Sep. 19, 1997

(30) Foreign Application Priority Data

Sep. 20, 1996 (JP) .................................................. 8-271863

(51) Int. Cl.[7] .................................................. H04L 12/28
(52) U.S. Cl. ........................ 370/254; 370/401; 370/395; 709/203
(58) Field of Search ................................... 370/216, 255, 370/217, 257, 395, 254, 389, 404, 410, 401; 455/200.33; 709/220, 221, 222, 203

(56) References Cited

U.S. PATENT DOCUMENTS

| | | | |
|---|---|---|---|
| 4,511,958 | * | 4/1985 | Funk . |
| 5,553,282 | * | 9/1996 | Parrish et al. .......................... 707/10 |
| 5,794,031 | * | 8/1998 | Nakadai ................................ 395/652 |
| 5,832,219 | * | 11/1998 | Pettus .................................. 395/200.33 |
| 5,835,481 | * | 8/1998 | Akyol et al. ........................... 370/216 |
| 5,835,911 | * | 11/1998 | Nakagawa et al. ................... 707/203 |

FOREIGN PATENT DOCUMENTS 2242895 8/1997 (CA) .
2278312 6/1998 (CA) .

OTHER PUBLICATIONS

Koichi Horikawa et al., "NHRP Architecture for Large Scale ATM Internet", *Technical Report of IEICE*, SSE96–51, Aug. 1996, pp. 49–54 with English Abstract.
Shimizu Hiroshi, "*ATM–LAN*", Jul. 5, 1995, pp. 131–135.
"Lan Emulation Over ATM": Version 1.0 Specification, (ATM Forum/94–0035R9), Jan. 6, 1995 pp. 62–74.

* cited by examiner

Primary Examiner—Chau Nguyen
Assistant Examiner—Alexander O. Boakye

(57) ABSTRACT

A node configuration setup system comprises a configuration client node connected to a connection-oriented network, and a number of configuration server nodes interconnected via the network. A first configuration server node is responsive to an initial configuration inquiry message from the client node for returning a ready-to-accept message if it holds the client's configuration data. If not, the first configuration server node selects a second configuration server node and causes the client node to download its configuration data from the second configuration server node either directly or via the first configuration server node if the client's data is located in the second configuration server node.

19 Claims, 12 Drawing Sheets

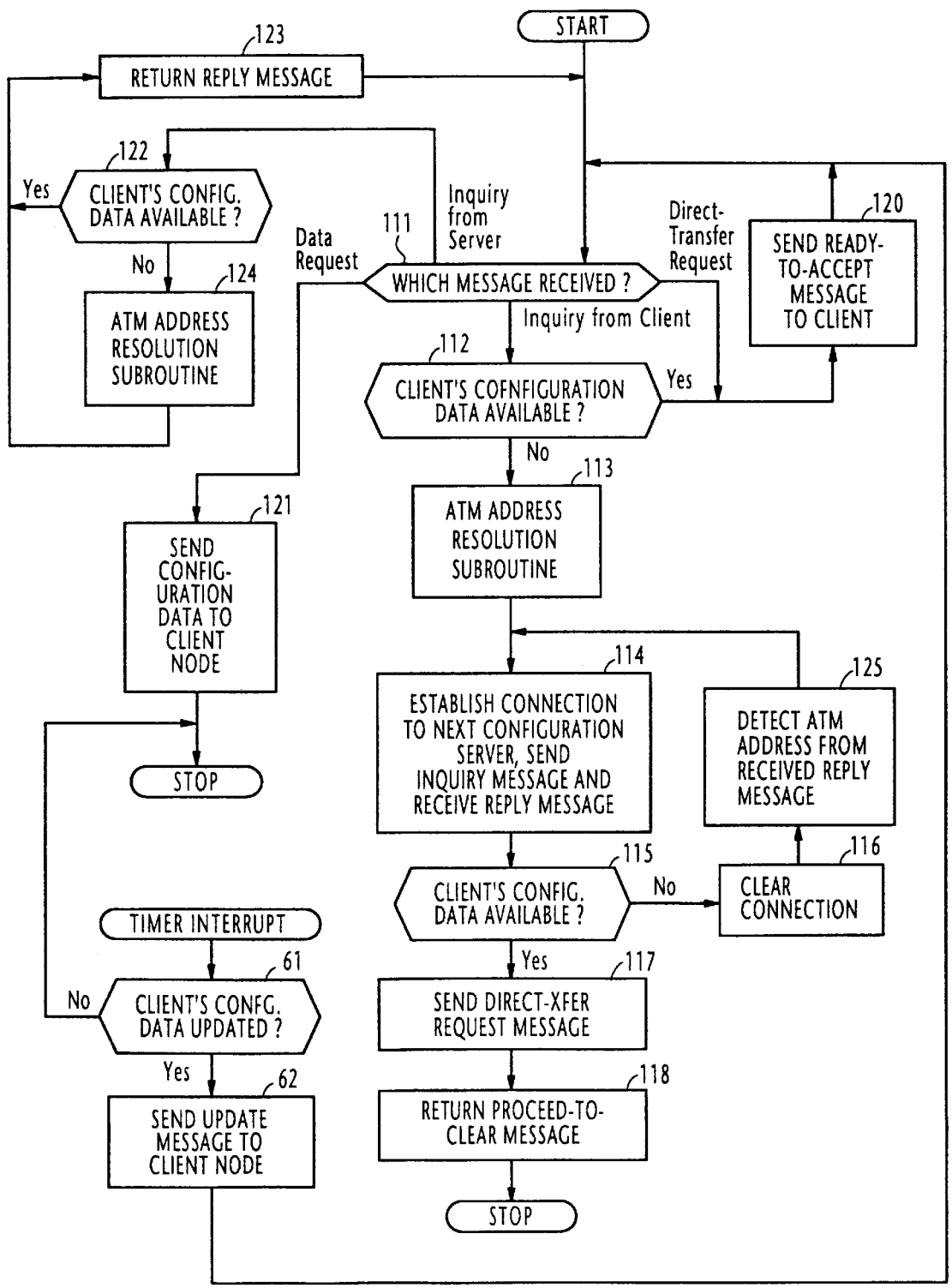

NODE CONFIGURATION SETUP SYSTEM WITH SERVERS HUNTING THROUGH CONNECTION-ORIENTED NETWORK FOR CLIENT'S DATA

BACKGROUND OF THE INVENTION

1. Field of the Invention

The present invention relates generally to connection-oriented communication networks, and more specifically to a node configuration system and method for connection-oriented communication networks.

2. Description of the Related Art

In conventional connection-oriented networks, the configuration of client nodes during initial setup usually involves manual procedures by network operators. In order to relieve the network operators from the time-consuming procedures, a configuration procedure has been proposed as described in "LAN Emulation Over ATM: Version 1.0 Specification", (ATM Forum/94-0035R9), Jan. 6, 1995, pages 62 to 74. According to the prior art configuration procedure, "anycasting" technique is used when a configuration client node attempts to send a packet to one of a group of configuration server nodes if the ATM address of the server node cannot be obtained. This technique is like multicasting in that the destination is a group of addresses, but instead of trying to deliver the packet to all of them, it tries to deliver it to the nearest configuration server node. Anycasting uses a regular unicast (anycast) address. It is up to the routing system to choose the nearest server.

However, one disadvantage of this anycasting approach is that it imposes limitations on the system configuration of a connection-oriented network. Another disadvantage is that, when client's configuration data, which is stored in the configuration server node, is altered, the prior art procedure has no means for detecting and using such alterations for updating the client nodes.

SUMMARY OF THE INVENTION

It is therefore an object of the present invention to provide a node configuration setup system and method which give flexibility to the design and configuration of connection-oriented networks.

Another object of the present invention is to provide a node configuration setup system which automatically updates client's configuration data.

According to a broader aspect of the present invention, there is provided a node configuration setup system comprising a configuration client node connected to a connection-oriented network, and a plurality of configuration server nodes interconnected via the network. A first configuration server node is responsive to an initial configuration inquiry message from the client node for returning a ready-to-accept message if client's configuration data is located in the first configuration server node, selecting a second configuration server node if the client's data is not located in the first configuration server, and causing the client node to download the client's data from the second configuration server node either directly or via the first configuration server node if the client's data is located in the second configuration server node.

According to a first narrower aspect, the present invention provides a node configuration system which comprises a configuration client node connected to a connection-oriented communication network, and a plurality of configuration server nodes interconnected via the network A first configuration server node is responsive to an initial configuration inquiry message from the configuration client node for transmitting a ready-to-accept message to the client node if client's configuration data is located in the first configuration server node, selecting a second configuration server node if the data is located in the second configuration server rather than in the first configuration server node, and transmitting a change-server message to the configuration client node. The configuration client node is responsive to the ready-to-accept message for downloading the client's configuration data from the first configuration server node and responsive to the change-server message for accessing the second configuration server node and downloading the client's configuration data therefrom.

According to a second narrower aspect, the present invention provides a node configuration system comprising a configuration client node connected to a connection-oriented communication network, and a plurality of configuration server nodes interconnected via the network. A first configuration server node is responsive to an initial configuration inquiry message from the configuration client node for transmitting a first ready-to-accept message to the client node if client's configuration data is located in the first configuration server node, selecting a second configuration server node if the data is located in the second configuration server rather than in the first configuration server node, and receiving the client's configuration data from the second configuration server node and transmitting a second ready-to-accept message to the configuration client node. The configuration client node is responsive to either of the first and second ready-to-accept messages for downloading the client's configuration data from the first configuration server node.

According to a third narrower aspect, the present invention provides a node configuration system comprising a configuration client node connected to a connection-oriented communication network, and a plurality of configuration server nodes interconnected via the network. A first configuration server node is responsive to an initial configuration inquiry message from the configuration client node for transmitting a ready-to-accept message to the client node if client's configuration data is located in the first configuration server node, selecting a second configuration server node if the data is located in the second configuration server rather than in the first configuration server node, and transmitting a direct-transfer request message to the second configuration server node. The second configuration server node is responsive to the direct-transfer request message for transmitting a second ready-to-accept message to the configuration client node. The configuration client node is responsive to the first ready-to-accept message for downloading the client's configuration data from the first configuration server node and responsive to the second ready-to-accept message for downloading the client's configuration data from the second configuration server node.

According to a further aspect, the present invention provides a node configuration setup system comprising a configuration client node connected to a connection-oriented communication network, and a configuration server node connected to the network for transmitting an update message to the configuration client node when client's configuration data is updated. The configuration client node is responsive to the update message for accessing the configuration server node and downloading the updated client's configuration data therefrom.

BRIEF DESCRIPTION OF THE DRAWINGS

The present invention will be described in further detail with reference to the accompanying drawings, in which:

FIG. 12 is a flowchart of the operation of the configuration server node according to a modification of the third embodiment.

DETAILED DESCRIPTION

Figure 1:
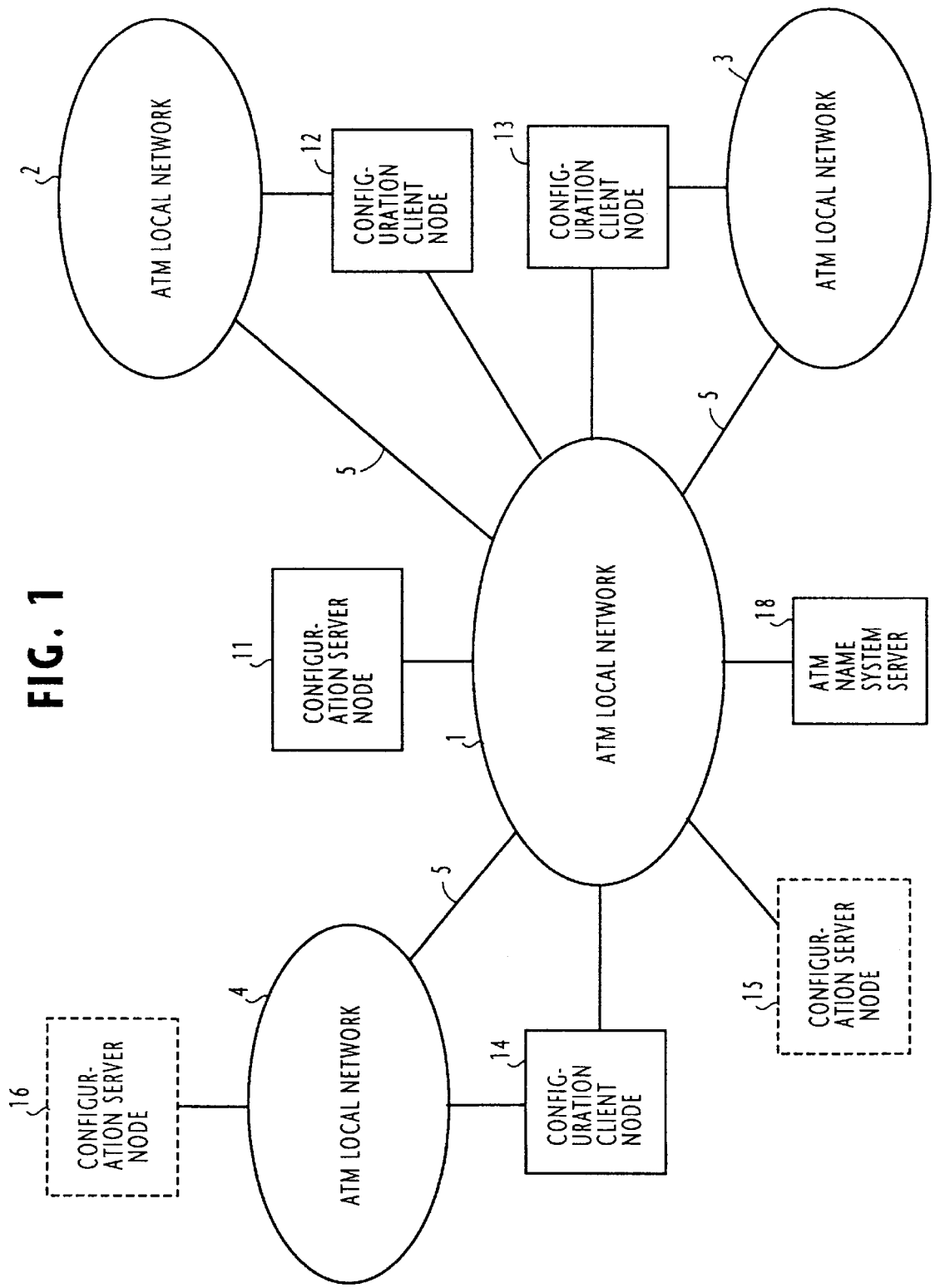
FIG. 1 is a block diagram of a connection-oriented network embodying the present invention.

Referring now to FIG. 1, there is shown a connection-oriented communication network consisting of a plurality of ATM (asynchronous transfer mode) local networks 1, 2, 3 and 4 which are interconnected by communication links 5. To the ATM local network 1 is connected a configuration server node 11 and a plurality of configuration client nodes 12, 13 and 14, which are further connected to networks 2, 3 and 4, respectively, to function as a router. Other configuration server nodes may be connected to networks 1 and 4, respectively, as indicated by dotted rectangles 15 and 16. An ATM name system server 18 is connected to network 1. Each of the configuration client nodes 12 to 14 has the functionality of router for routing packets between the ATM networks.

Figure 2:
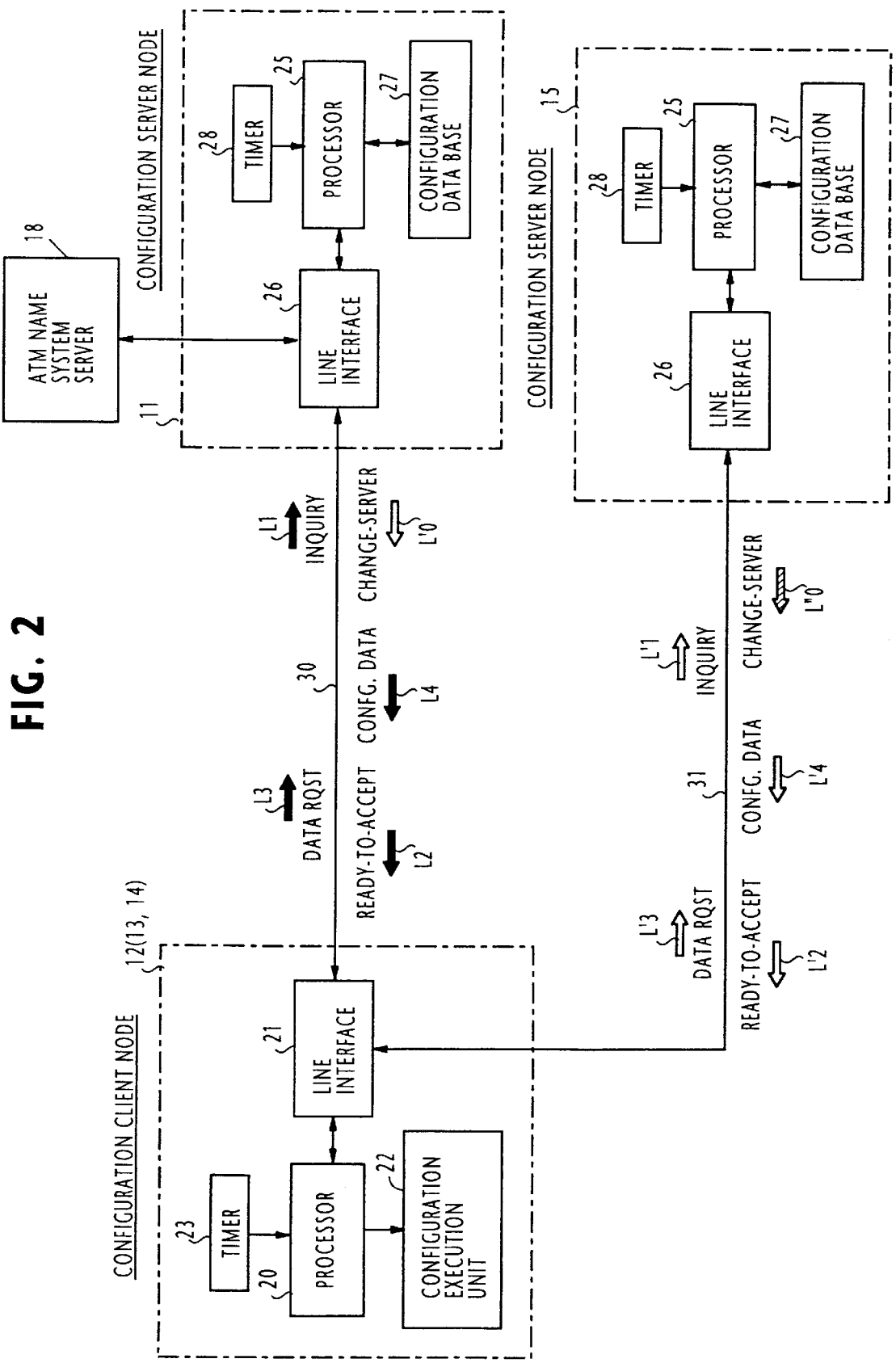
FIG. 2 is a schematic block diagram of the network illustrating details of a configuration client node and configuration server nodes and a number of messages transmitted through the network according to a first embodiment of the present invention.

As shown in FIG. 2, each configuration client node has a processor 20 which performs interactive communication with configuration servers via line interface 21. To the processor 20 are connected a configuration execution unit 22 and a timer 23 which issues a timer-interrupt command to the processor 20 at periodic intervals to cause it to check for the reception of an update message from a configuration server.

Each configuration server node has a processor 25 connected to the associated ATM local network via line interface 26. A configuration data base 27 is provided for storing clients' configuration data. A timer 28 issues a timer-interrupt command at periodic intervals to cause the processor 25 to examine the contents of data base 27 for detecting updates.

According to a first embodiment, when configuration client node 12, for example, wishes to execute an initial configuration procedure, it selects the server 11, for example, as a default server and establishes a virtual connection 30 to it and sends an inquiry message L1 containing the client's identifier. If the default server 11 holds the client configuration data, it returns a ready-to-accept message L2, urging the client node to send a data request message L3. In response, the server node 11 sends out the client's configuration data L4 to the node requesting it. If the server node 11 has no client data, it obtains the ATM address of a second server as a possible candidate from the ATM name system server 18 and returns a change-server message L'0 to urge the client 12 to establish a virtual connection 31 and send an inquiry message L'1 to the second server 15. If the second server finds that client's configuration data is available, it sends a ready-to-accept message L'2 to the client 12, urging it to send a data request message L'3 to download the configuration data L'4 from the data base 27 of the second server. If the client's configuration data is not located in the second server, the latter obtains the ATM address of a third configuration server from the ATM name system server 18 and informs the requesting client of this ATM address by a change-server message L"0 to repeat the process for the third configuration server.

Figure 3:
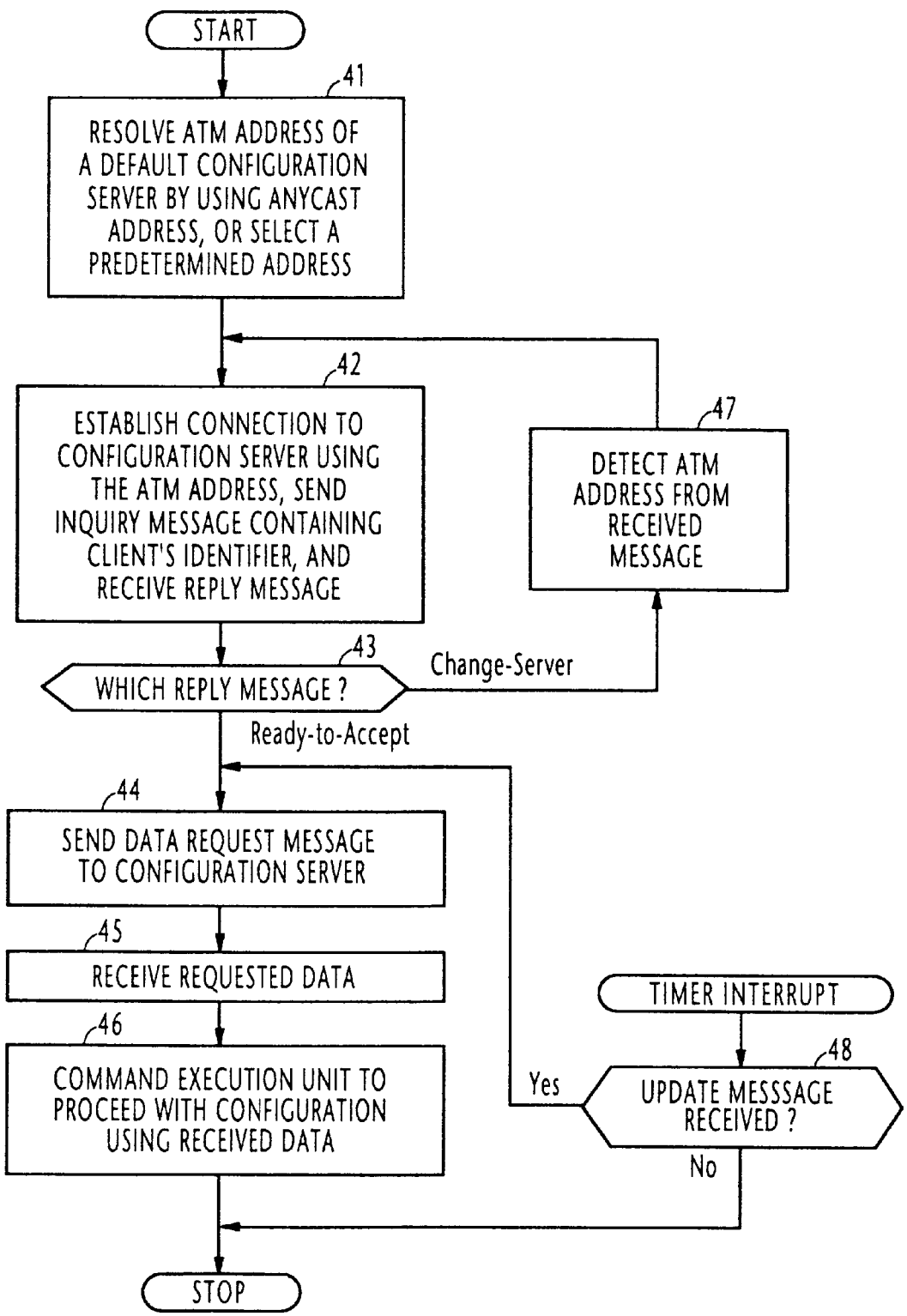
FIG. 3 is a flowchart of the operation of each client node during configuration phase according to the first embodiment.

FIG. 3 shows details of the initial configuration routine of the processor 20 of each configuration client node. At step 41, the ATM address of a default configuration server is determined by performing an ATM address resolution by transmitting an "anycast" address to the network, or an ATM address predetermined for the default configuration server is selected.

The processor's routine proceeds to step 42 to establish a virtual connection 30 (FIG. 2) to the default configuration server using the ATM address that is determined at step 41. This is followed by the transmission of an inquiry message which contains the identification number (i.e., client's identifier) of the requesting client node. The client's identifier is represented by IP address, host name, ATM address, MAC address, domain name plus function name, and subnet address plus function name. A reply message will then be sent back from the default configuration server to the client node requesting it.

The requesting client node determines, at decision step 43, whether the reply message is a ready-to-accept message or a change-server message.

If the ready-to-accept message is the one the requesting client has received, it is determined that the client's configuration data is located in the default configuration server. The routine proceeds from step 43 to step 44 to send a data request message to the default configuration server to receive the configuration data (step 45). The routine then advances to step 46 to command the configuration execution unit 22 to proceeds with the necessary configuration procedures using the received data.

If the change-server message is the one the requesting client has received, it is determined that the client's configuration data is not located in the default configuration server. The routine proceeds from step 43 to step 47 to examine the received change-server message and detect an ATM address identifying a second configuration server, and returns to step 42. The processor 20 uses this ATM address to execute step 42 so that a virtual connection 31, FIG. 2, is established to the second configuration server and an inquiry message is delivered. If the reply from the second server to this inquiry message is a ready-to-accept message, the client node sends a data request message to the second server to download the configuration data (step 45). If the reply message from the second server is a change-server message, steps 47 and 42 are executed again to repeat the search subroutine for a third configuration server.

Figure 4:
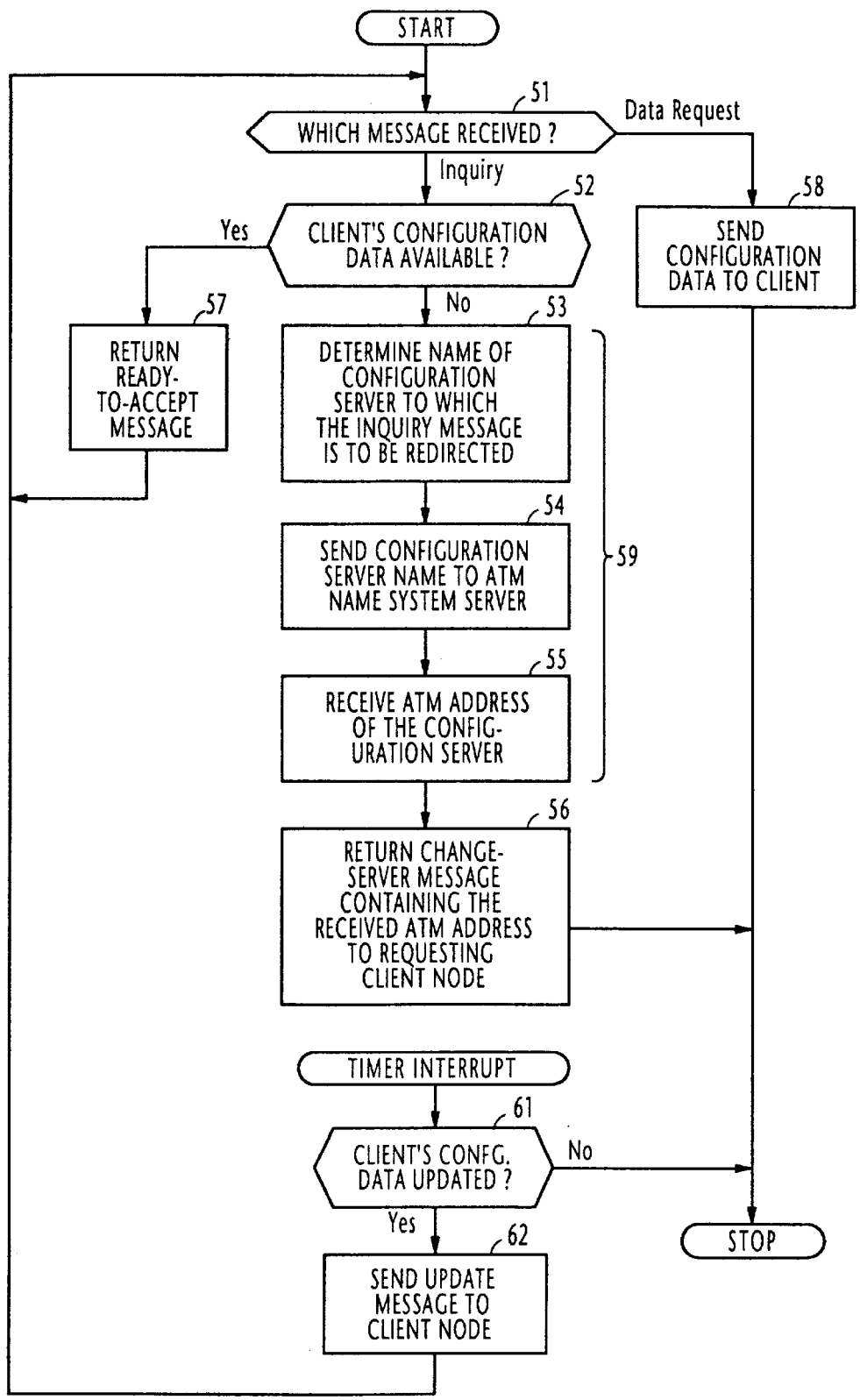
FIG. 4 is a flowchart of the operation of each configuration server node according to the first embodiment.

In each of the configuration server nodes, the initial configuration routine of the processor 25 proceeds as shown in FIG. 4. Processor 25 constantly monitors a message it receives from the network at step 51 and checks to see if the received message is an inquiry or a data request message from a configuration client node. If the received message is an inquiry message, the routine proceeds from step 51 to step 52 where the processor 25 examines the contents of the configuration data base 27 and determines whether it holds the configuration data of the inquiring client node. If so, the routine proceeds from step 52 to step 57 to return a ready-to-accept message to the inquiring node and returns to the starting point of the routine. Following the transmission of the ready-to-accept message, processor 25 waits, at step 41, for a data request message from the client node. In response to the data request message, the configuration server proceeds to step 58 to download the client's configuration data to the requesting client node, and terminates the routine.

If the decision at step 52 is negative, the routine proceeds to ATM address resolution subroutine 59 comprising steps 53, 54 and 55. At step 53 the processor 25 examines the client's identifier contained in the inquiry message for an appropriate configuration server to which the inquiry message is to be redirected and determines the name (i.e., host name or IP address) of this server. Processor 25 sends the server name to the ATM name system server 18 (step 54) to receive the ATM address of the server (step 55). The processor 25 proceeds to step 56 where the server returns a change-server message to the inquiring client node. This change-server message contains the ATM address received from the ATM name system server 18. Following the execution of step 56, the processor terminates the routine Processor 25 is responsive to a timer-interrupt command periodically issued from the timer 28 by accessing the data base 27 (step 61) and determines if there is an update in client's configuration data. If there is none, the processor exits to the end of the interrupt routine. If there is one, the routine proceeds to step 62 to send an update message to a configuration client node whose configuration data has been updated. Reverting to FIG. 3, the processor 20 in each configuration client node is responsive to a timer-interrupt command from the timer 23 for executing step 48 by determining whether it has received an update message from the configuration server from which its configuration data had been downloaded. If the decision is affirmative, the routine proceeds from step 48 to step 44 to send a data request message to the configuration server node to receive the updated data (step 45). Using the received configuration data, the execution unit 22 updates the configuration of the client node (step 46).

When the configuration data of a client node is not located in the default configuration server, the latter, instead of the client, may inquire a second server about its availability in a manner as will be described with reference to FIG. 5.

According to a second embodiment, if the default server 11 recognizes that there is no client configuration data on receiving an inquiry message M1 from client node 12, it obtains the ATM address of a second server 15 from the ATM name system server 18, establishes a connection 32 to it, and sends an inquiry message M2, asking whether it holds the client's configuration data. The second server responds with a reply message M3. If the reply message indicates that the client's data is in the second server, the default server sends a forward-transfer request message M4 to fetch the client's configuration data M5 from the second server and urges the client node 12 with a ready-to-accept message M6 to send a data request message M7 to the default server 11. In response, the default server 11 forwards the client's configuration data M8 to the client node 12. If the reply message M3 indicates that the client's configuration data is not available in the second server, the default server obtains the ATM address of another server for a further attempt, and the process will be repeated until the client data is located.

Figure 6:
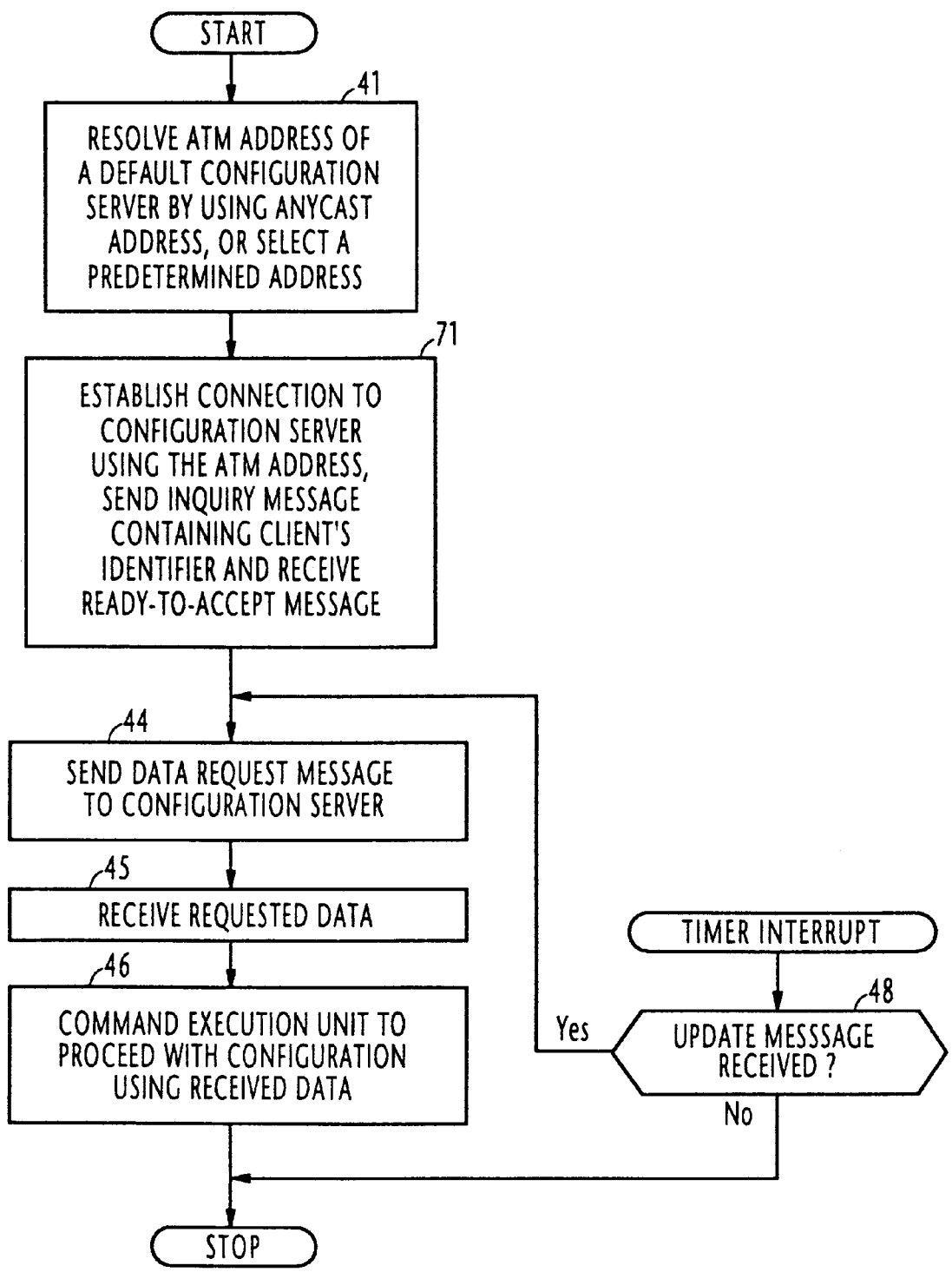
FIG. 6 is a flowchart of the operation of the client node according to the second embodiment.

The initial configuration routine of the client node according to the second embodiment is shown in FIG. 6 in which steps corresponding in significance to those of FIG. 3 are marked with the same numerals. It is seen that FIG. 6 differs from the previous embodiment by the provision of step 71, instead of steps 42, 43 and 47 of FIG. 3. Following the execution of step 41, the configuration client node proceeds to step 71 to establish a connection to a second server using the ATM address obtained at step 41, and sends an inquiry message containing the client's identifier, and then waits for a ready-to-accept message.

Figure 7:
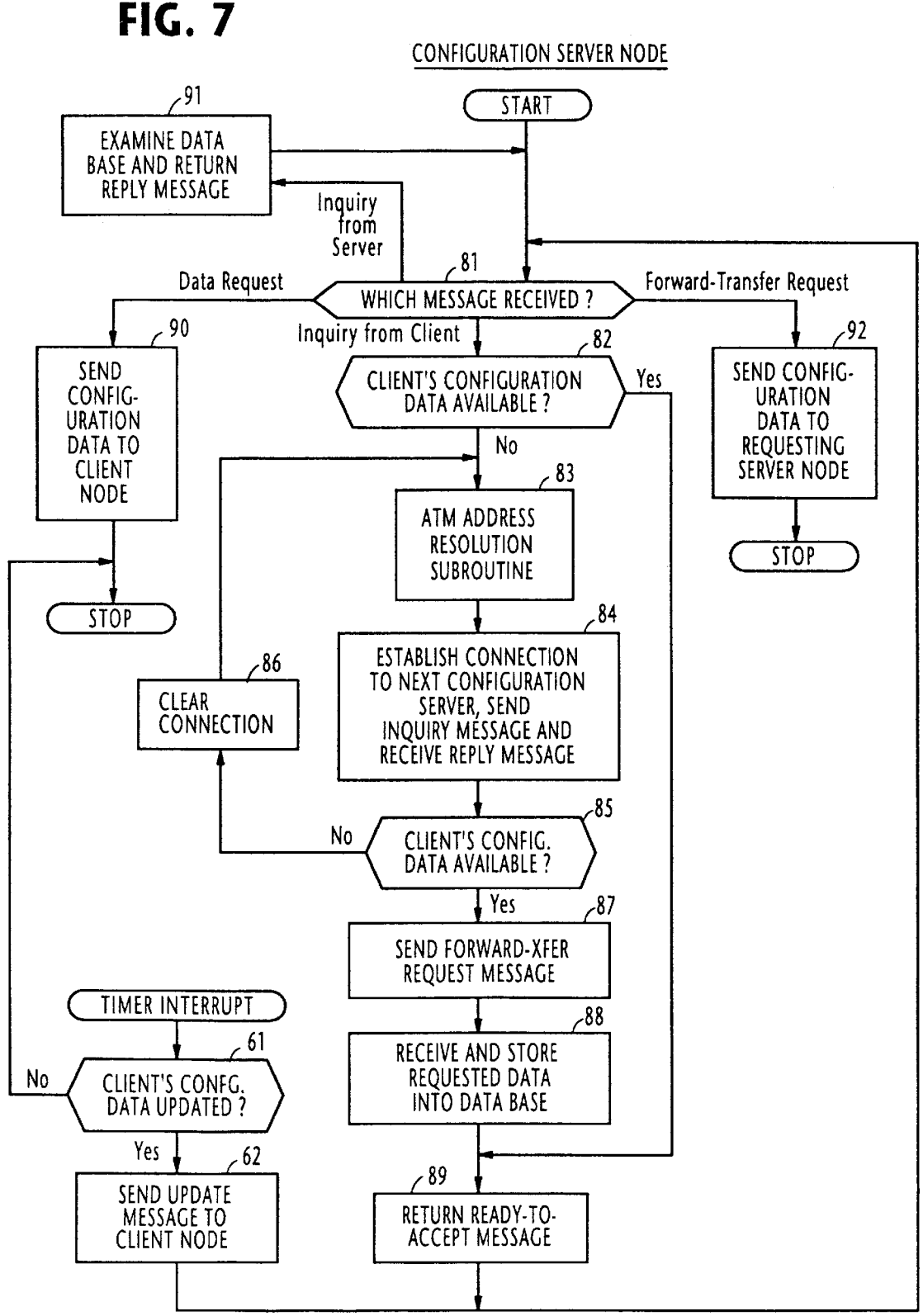
FIG. 7 is a flowchart of the operation of the configuration server node according to the second embodiment.

In FIG. 7, the processor 25 of each server constantly monitors a message it receives from the network at step 81 and checks to see if the received message is an inquiry or a data request message from a configuration client node, and checks to see if it is an inquiry or a forward-transfer request message from a configuration server node.

In response to an initial configuration inquiry message from the client node, the default configuration server proceeds from step 81 to step 82 to check the data base to see if the client's configuration data is available. If so, the routine proceeds to step 89 to urge the client with a ready-to-accept message to send a data request message in the same manner as in the previous embodiment.

If the decision at step 82 is negative, the routine proceeds to ATM address resolution subroutine 83 to obtain the ATM address of a second configuration server from the ATM name system server 18. Using the ATM address from the ATM name system server 18, the default server establishes a connection to the second configuration server and sends an inquiry message, asking whether it holds the client's configuration data and receives a reply message (step 84).

If the reply message indicates that the second server does not hold the client configuration data, the routine proceeds from step 85 to step 86 to clear the connection to the second server, and flow returns to ATM address resolution subroutine 83 where the processor 25 determines a third configuration server. If the decision at step 85 is affirmative, the first configuration server sends a forward-transfer request message to the second server (step 87), requesting that the client's data be sent from the second server to the first server. When the default server receives the client' data from the second server, it stores the received data into the data base (step 88) and returns a ready-to-accept message to the requesting client node (step 89), and flow returns to the starting point of the routine to wait for a data request message from the requesting client node.

When the data request message is received, the default configuration server proceeds from step 81 to step 90 to forward the stored client's data to the client node.

When each of the configuration servers of the network is interrogated by a requesting configuration server, it receives an inquiry message from the requesting server, and proceeds from step 81 to step 91 to examine the data base and returns a reply message indicating whether the client's data is available or not. Following the transmission of the reply message, flow returns to step 81 to wait for a subsequent message. When a forward-transfer request message is subsequently received from the requesting server, the routine proceeds from step 81 to step 92 to send the client's configuration data stored in the data base to the requesting server, and the routine is terminated.

Figure 5:
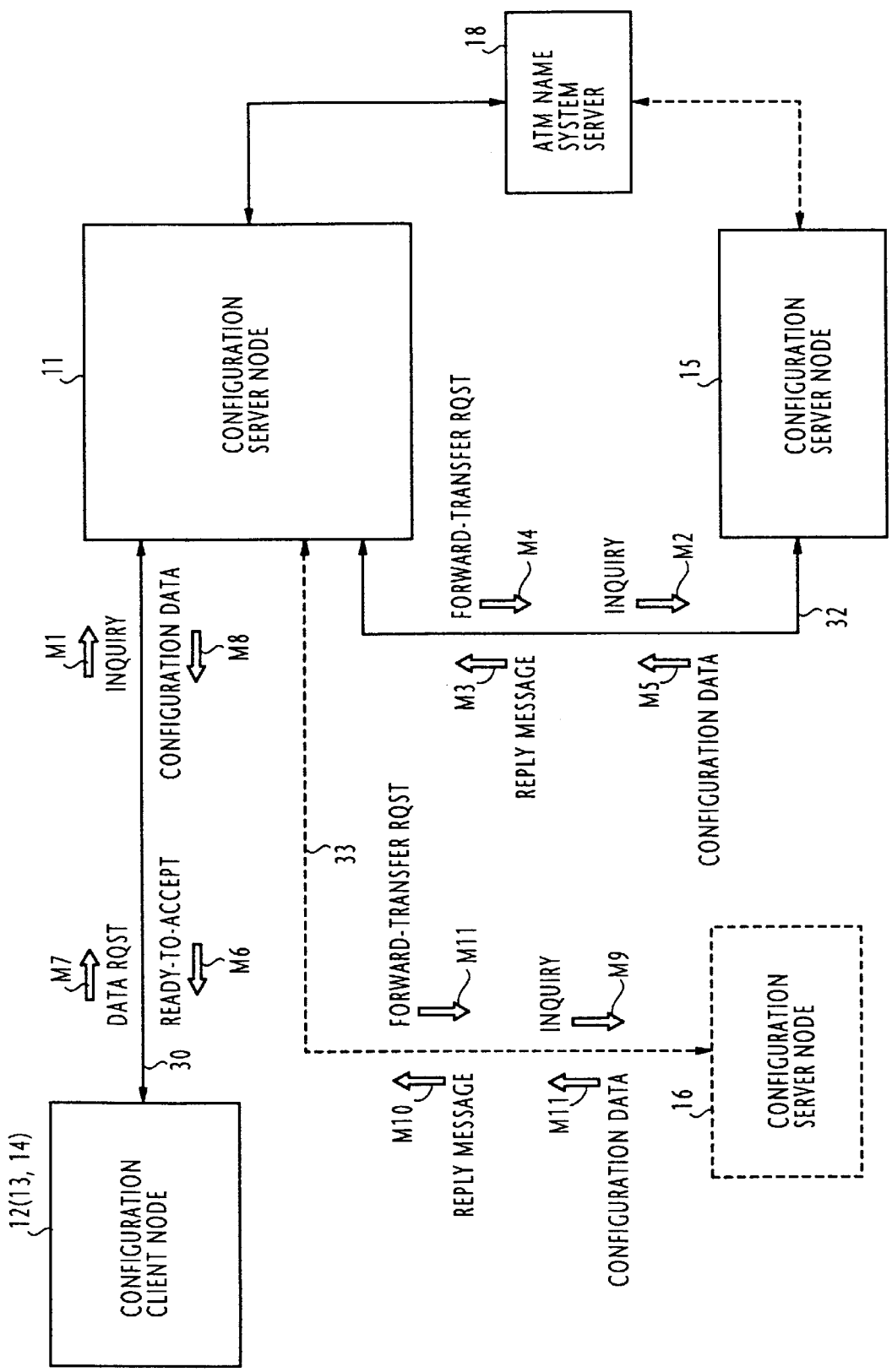
FIG. 5 is a schematic block diagram of the network illustrating a number of messages transmitted through the network according to a second embodiment of the present invention when the default configuration server node has no client's data.

The second embodiment can be modified as shown in dotted lines in FIG. 5. In this modification, the second configuration server 15 takes the responsibility to select a third configuration server 16, for example, using the ATM name system server 18 on behalf of the default server 11. When the third server 16 is selected, the second server 15 informs the first (default) server 11 of the ATM address of the third server obtained from the name system server 18. A connection 33 is then established from the first server 11 to the third server 16 and the first server sends an inquiry message M9 to the third server. In response, the third server checks its data base for the availability of the client's configuration data, and returns a reply message M10 to the first configuration server. If the reply message M10 indicates that the client's configuration data is available, the default server will send a forward-transfer request message M11 to the third server 16 to request the client's data M12.

Figure 8:
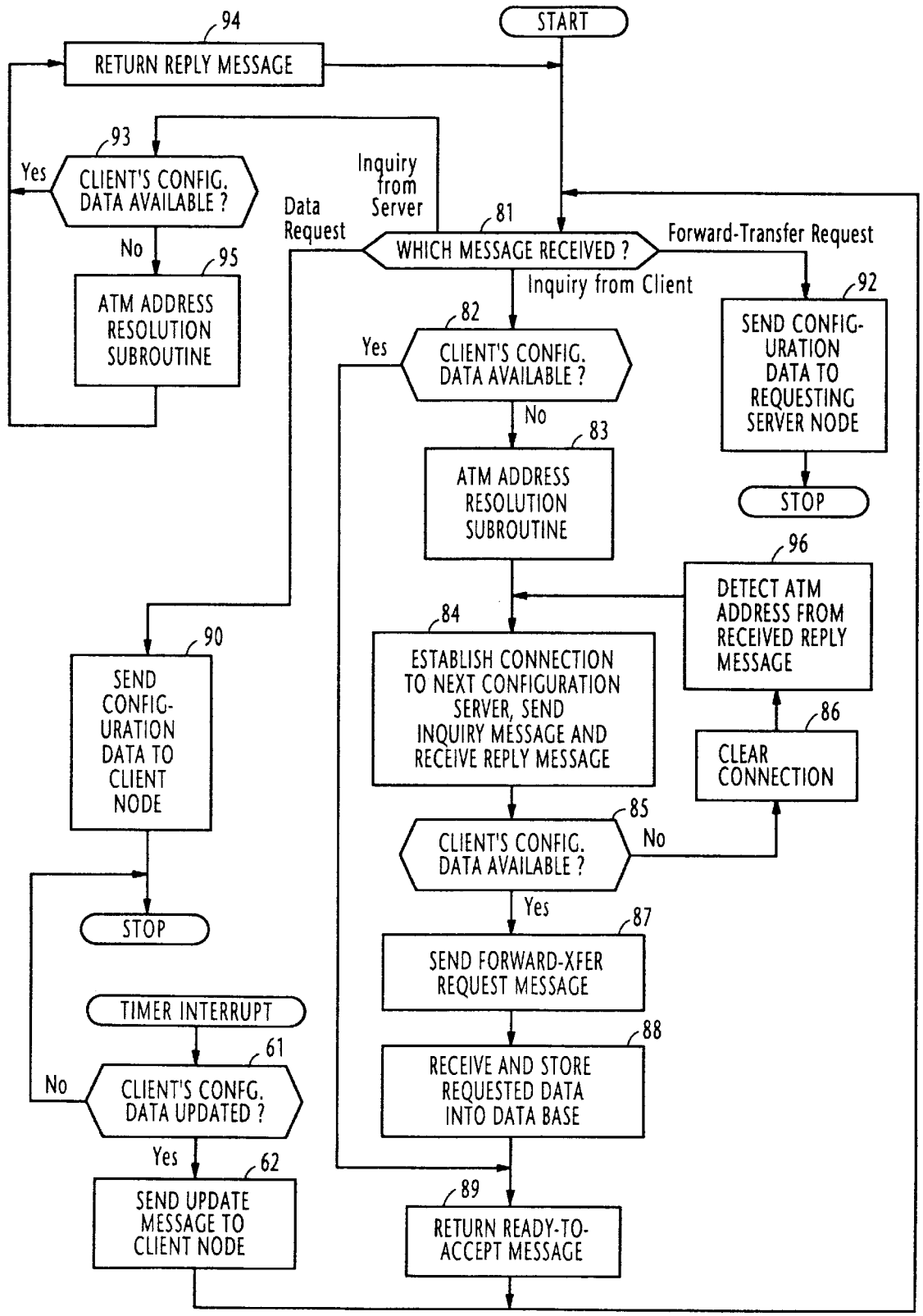
FIG. 8 is a flowchart of the operation of the configuration server node according to a modification of the second embodiment.

A flowchart of this modification is shown in FIG. 8, which differs from the flowchart of FIG. 7 as follows. When the second server receives an inquiry message from the default server, it proceeds from step 81 to step 93 to check its data base for the availability of the client's configuration data. If the answer is affirmative, flow proceeds from step 93 to step 94 to return a reply message to the default server to so indicate and returns to step 81 to wait for a subsequent forward-transfer request message from the default server. If the client's configuration data is not available, flow branches at step 93 to step 95 to execute an ATM address resolution subroutine, and proceeds to step 94 to return a reply message to the default server, containing the ATM address obtained by the address resolution subroutine.

When the reply message from the second server indicates unavailability of the client's configuration data (step 85), the default server clears the connection to the second server (step 86) and proceeds to step 96 to detect the ATM address from the reply message and returns to step 84 to establish a connection to a third configuration server identified by the detected ATM address.

When the configuration data of a client node is located in a server node which is interrogated by the default server, the interrogated server may take the responsibility to download the client's configuration data if present, rather than forwarding it to the requesting server in a manner as will be described below with reference to FIG. 9, which can be implemented as a third embodiment of the present invention.

If the default server 11 recognizes that there is no client configuration data on receiving an inquiry message N1 from client node 12, it obtains the ATM address of a second server 15 from the ATM name system server 18 and establishes the connection 32 to it, and sends an inquiry message N2, asking whether it holds the client's configuration data, in the same manner as in the second embodiment. The second server responds with a reply message N3. If the reply message indicates that the client's data is in the second server, the default server sends a direct-transfer request message N4 to the requesting server 11 and a proceed-to-clear message N5 to the client node 12 to clear the connection 30. In response to the direct-transfer message N4, the second server 15 urges the client node 12 with a ready-to-accept message N6 to send a data request message N7. In response, the second server 15 sends the client's configuration data N8 to the client node 12. If the reply message N3 indicates that the client's data is not available in the second server, the default server obtains the ATM address of another server for further attempts, and the process will be repeated until the client data is found.

Figure 10:
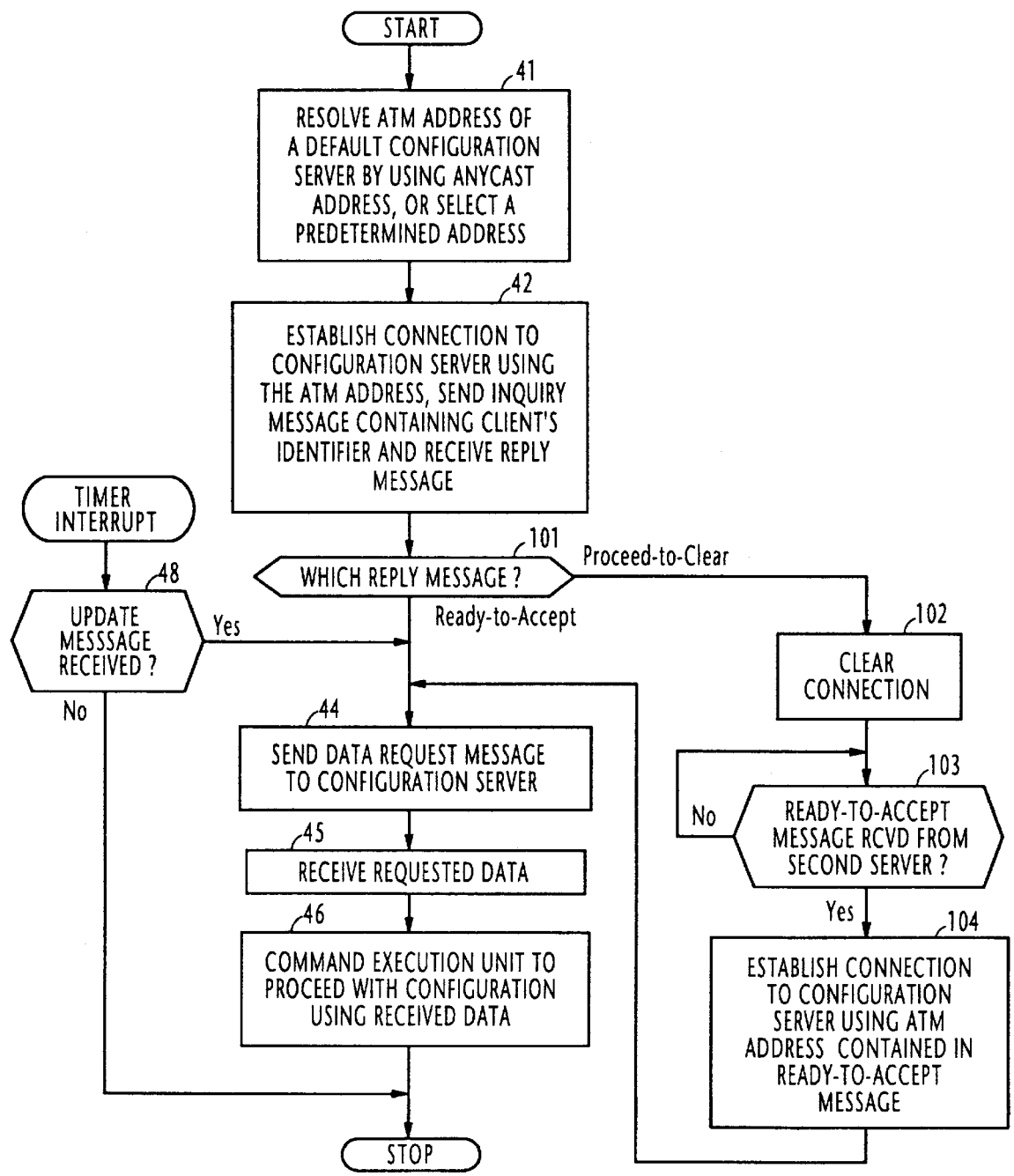
FIG. 10 is a flowchart of the operation of the client node according to the third embodiment.

The initial configuration routine of the client node according to the third embodiment is shown in FIG. 10 in which steps corresponding in significance to those of FIG. 3 are marked with the same numerals. It is seen that FIG. 10 differs from the first embodiment by the provision of steps 101 to 104. Following the execution of step 42, the configuration client node proceeds to step 101 to check to see if the reply message is a ready-to accept message from the default server or a proceed-to-clear message. If the received message is a ready-to-accept message, control will be directed down the "Ready-to-Accept" branch and steps 44 to 46 are executed. If the received message is a proceed-to-clear message, the "Proceed-to-Clear" branch will be followed and the connection to the default server is cleared (step 102) and the client node waits for a ready-to-accept message from a second server (step 103). When this message is received, the client routine proceeds from step 103 to step 104 to establish a connection to the second server using the ATM address contained in the received message, and the processor 20 executes steps 44 to 46 by sending a data request message to the second server for downloading the requested configuration data.

Figure 11:
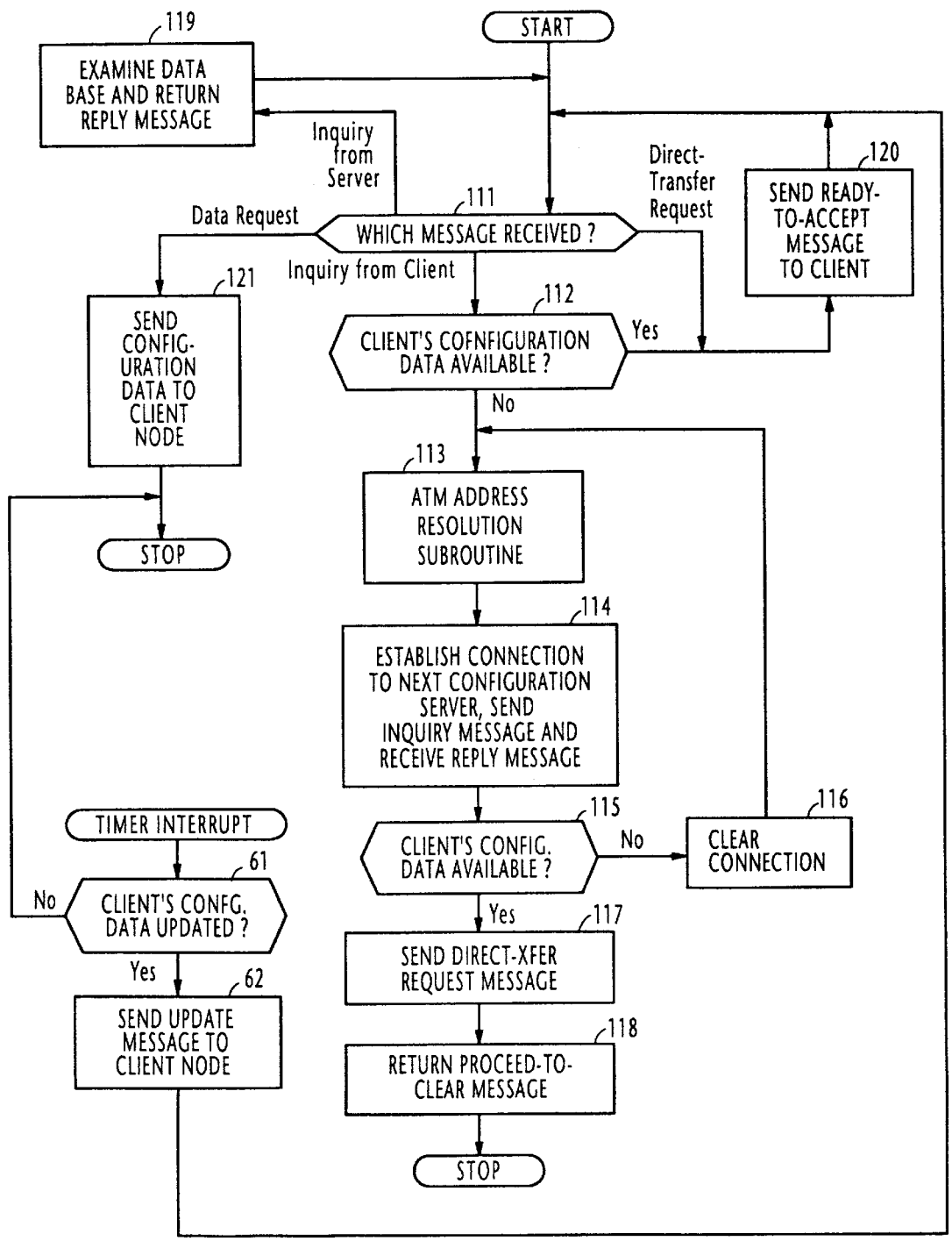
FIG. 11 is a flowchart of the operation of the configuration server node according to the third embodiment.

In response to the inquiry message from the client node, the default configuration server starts executing the initial configuration routine of FIG. 11 by examining the received message at step 111. Recognizing that the received message is an inquiry message from a client node, the default server proceeds to step 112 to check to see if the client's configuration data is stored in the data base. If so, the routine proceeds to step 120 to urge the client with a ready-to-accept message to send a data request message.

If the decision at step 112 is negative, the routine proceeds to ATM address resolution subroutine 113 to obtain the ATM address of a second configuration server from the ATM name system server 18. Using the ATM address from the ATM name system server 18, the default server establishes a connection to the second configuration server and sends an inquiry message, asking whether it holds the client's configuration data, and receives a reply message (step 114).

If the reply message indicates that the second server does not hold the client data, the routine proceeds from step 115 to step 116 to clear the connection between the default server and the second server, and flow returns to ATM address resolution subroutine 113 where the processor 25 determines a third configuration server. If the decision at step 115 is affirmative, the first configuration server sends a direct-transfer request message to the second server (step 117) and returns a proceed-to-clear message to the requesting client node (step 118), and the routine is terminated.

When each of the configuration servers of the network is interrogated by a requesting configuration server, it receives an inquiry message from the requesting server, and proceeds from step 111 to step 191 to examine the data base and returns a reply message indicating whether the client's data is available or not. Following the transmission of the reply message, flow returns to step 111 to wait for a subsequent message. When a direct-transfer request message is subsequently received from the requesting server, the routine proceeds from step 111 to step 120 to send a ready-to-accept message to the client node and waits for a data request message at step 111. When the data request message is subsequently received, the routine proceeds from step 111 to step 121 to forward the stored client's data to the client node.

Figure 9:
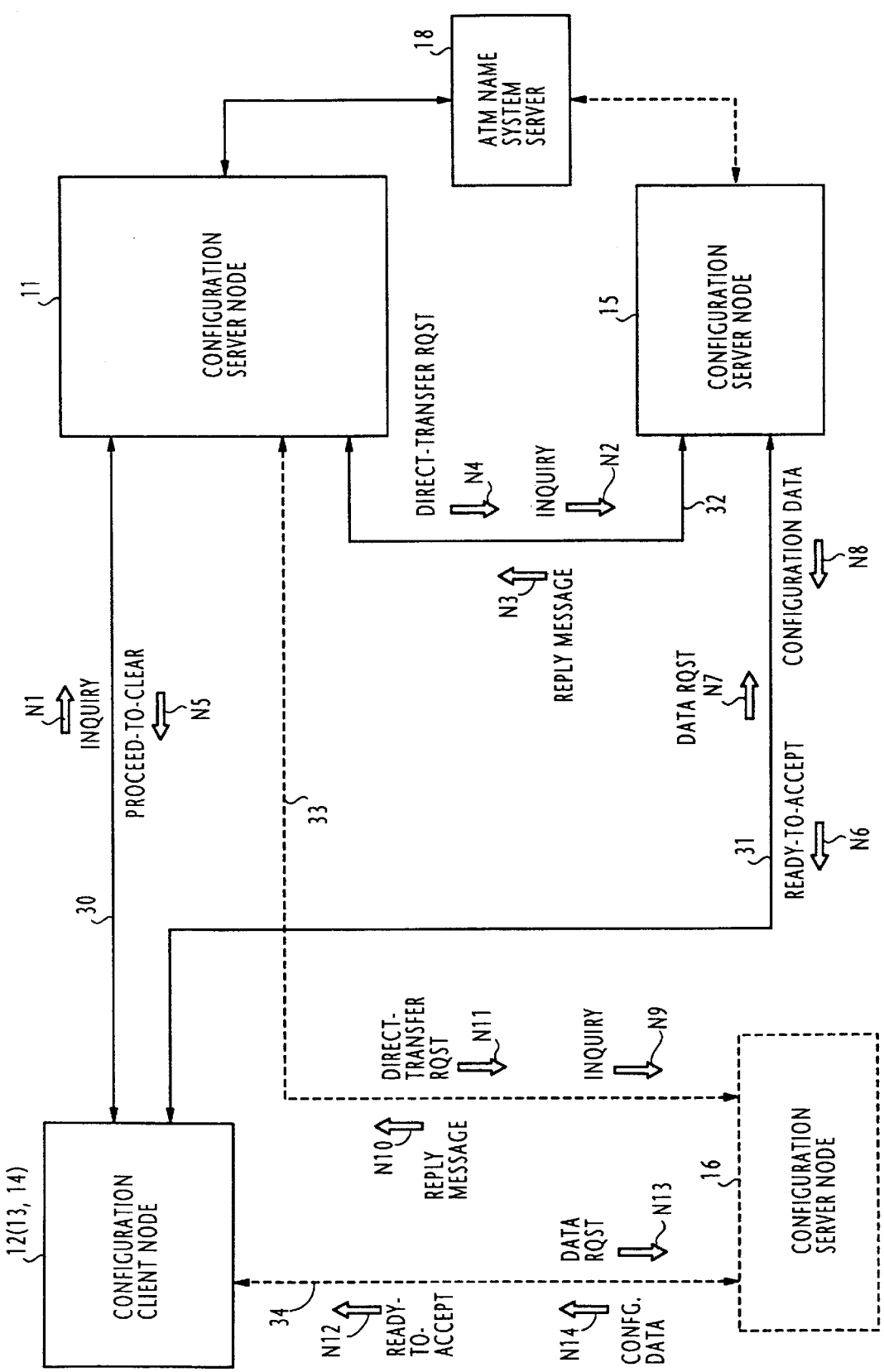
FIG. 9 is a schematic block diagram of the network illustrating a number of messages transmitted through the network according to a third embodiment of the present invention when the default configuration server node has no client's data.

Similar to the modification of the second embodiment, the third embodiment can be modified as shown in dotted lines in FIG. 9. In this modification, the second configuration server 15 takes the responsibility to select the third configuration server 16 using the ATM name system server 18 on behalf of the default server 11. When the third server 16 is selected, the second server 15 informs the default server 11 of the ATM address of the third server, and connection 33 is established between the default server 11 and the third server 16 and the first server sends an inquiry message N9 to the third server. In response, the third server checks its data base for the availability of the client's configuration data, and returns a reply message N10 to the default server. If the reply message N10 indicates that the client's configuration data is available, the default server will send a direct-transfer request message N11 to the third sewer 16, requesting it to establish a connection 34 to the client node and send a ready-to-accept message N12 to urge it to return a data request message N13, so that the client's data N14 is directly downloaded from the third server 16 into the client node.

A flowchart of this modification is shown in FIG. 12, which differs from the flowchart of FIG. 11 as follows. When the second server receives an inquiry message from the default server, it proceeds from step 111 to step 123 to check its data base for the availability of the client's configuration data. If the answer is affirmative, flow proceeds from step 123 to step 124 to return a reply message to the default server to so indicate and returns to step 111 to wait for a subsequent direct-transfer request message from the default server. If the client's configuration data is not available, flow branches at step 123 to step 124 to execute an ATM address resolution subroutine, and proceeds to step 123 to return a reply message to the default server, containing the ATM address obtained by the address resolution subroutine.

When the reply message from the second server indicates unavailability of the client's configuration data (step 115), the default server clears the connection to the second server (step 116) and proceeds to step 125 to detect the ATM address from the reply message and returns to step 114 to establish a connection to a third configuration server identified by the detected ATM address.

What is claimed is:

1. A node configuration set-up system for a connection-oriented communication network, comprising:
    a configuration client node connected to the network; and
    a plurality of configuration server nodes interconnected via said network, a first one of the configuration server nodes being responsive to an initial configuration inquiry message from the configuration client node for transmitting a ready-to-accept message to the client node if client's configuration data is located in the first configuration server node, selecting a second configuration server node from said plurality of configuration server nodes if said data is not located in the first configuration server, and causing the configuration client node to download the client's data from the second configuration server node either directly or via said first configuration server node if the client's data is located in the second configuration server node.

2. A node configuration set-up system for a connection-oriented communication network, comprising:
    a configuration client node connected to the network; and
    a plurality of configuration server nodes interconnected via said network, a first one of the configuration server nodes being responsive to an initial configuration inquiry message from the configuration client node for transmitting a ready-to-accept message to the client node if client's configuration data is located in the first configuration server node, selecting a second configuration server node from said plurality of configuration server nodes if said data is located in the second configuration server rather than in the first configuration server node, and transmitting a change-server message to said configuration client node,
    said configuration client node being responsive to the ready-to-accept message for downloading the client's configuration data from the first configuration server node and responsive to the change-server message for accessing the second configuration server node and downloading the client's configuration data therefrom.

3. A node configuration setup system for a connection-oriented communication network, comprising:
    a configuration client node connected to the network; and
    a plurality of configuration server nodes interconnected via said network, a first one of the configuration server nodes being responsive to an initial configuration inquiry message from the configuration client node for transmitting a first ready-to-accept message to the client node if client's configuration data is located in the first configuration server node, selecting a second configuration server node from said plurality of configuration server nodes if said data is located in the second configuration server rather than in the first configuration server node, and receiving the client's configuration data from the second configuration server node and transmitting a second ready-to-accept message to the configuration client node,
    said configuration client node being responsive to either of the first and second ready-to-accept messages for downloading the client's configuration data from the first configuration server node.

4. A node configuration setup system as claimed in claim 3, wherein said first configuration server node is arranged to select a third configuration server node from said plurality of configuration server nodes if said data is located in the third configuration server rather than in the second configuration server node, and receiving the client's configuration data from the third configuration server node and transmitting said second ready-to-accept message to the configuration client node.

5. A node configuration setup system as claimed in claim 3, wherein said second configuration server node is arranged to select a third configuration server node from said plurality of configuration server nodes if said data is located in the third configuration server rather than in the second configuration server node, and transmitting a reply message to the first configuration server node, wherein said first configuration server node is responsive to the reply message for receiving the client's configuration data from the third configuration server node and transmitting said second ready-to-accept message to the configuration client node.

6. A node configuration setup system for a connection-oriented communication network, comprising:
    a configuration client node connected to the network; and
    a plurality of configuration server nodes interconnected via said network, a first one of the configuration server nodes being responsive to an initial configuration inquiry message from the configuration client node for transmitting a ready-to-accept message to the client node if client's configuration data is located in the first configuration server node, selecting a second configuration server node from said plurality of configuration server nodes if said data is located in the second configuration server rather than in the first configuration server node, and transmitting a direct-transfer request message to the second configuration server node, said second configuration server node being responsive to the direct-transfer request message for transmitting a second ready-to-accept message to the configuration client node, said configuration client node being responsive to the first ready-to-accept message for downloading the client's configuration data from the first configuration server node and responsive to the second ready-to-accept message for downloading the client's configuration data from the second configuration server node.

7. A node configuration setup system as claimed in claim 6, wherein said first configuration server node is arranged to select a third configuration server node from said plurality of configuration server nodes if said data is located in the third configuration server rather than in the second configuration server node and transmitting a direct-transfer message to the third configuration server node, wherein the third configuration server node is responsive to the direct-transfer message for transmitting said second ready-to-accept message to the configuration client node.

8. A node configuration setup system as claimed in claim 6, wherein said second configuration server node is arranged to select a third configuration server node from said plurality of configuration server nodes if said data is located in the third configuration server rather than in the second configuration server node, and transmitting a reply message to the first configuration server node, wherein said first configuration server node is responsive to the reply message for transmitting a direct-transfer message to the third configuration server node, wherein the third configuration server node is responsive to the direct-transfer message for transmitting said second ready-to-accept message to the configuration client node.

9. A node configuration setup system as claimed in claim 1, 2, 3 or 6, further comprising a name system server, wherein said first configuration server node is arranged to access said name system server to obtain address information of said second configuration server node.

10. A node configuration setup system as claimed in claim 1, 2, 3 or 6, wherein said network comprises an asynchronous transfer mode network.

11. A node configuration setup system as claimed in claim 1, 2, 3 or 6, wherein each of said configuration server nodes is arranged to transmit update message to the configuration client node when the client's configuration data is updated, said configuration client node being responsive to the update message for accessing the configuration server node from which the update message is received and downloading the updated client's configuration data.

12. A node configuration setup method for a connection-oriented network, wherein a configuration client node is responsive to a ready-to-accept message from one of a plurality of configuration server nodes for downloading client's configuration data therefrom, comprising:

a) determining, at a first configuration server node in response to an initial configuration inquiry message from said client node, whether or not said data is located in the first configuration server node;

b) if it is determined that said data is located in the first configuration server node, transmitting the ready-to-accept message from the first configuration server node to the client node;

c) if it is determined that said data is not located in the first configuration server node, selecting, at the first configuration server node, a second configuration server node and transmitting a change-server message from the first configuration server node to the client node;

d) transmitting, in response to said change-server message, an initial configuration inquiry message from the client node to the selected configuration server node;

e) determining, at the selected configuration server node in response to the inquiry message, whether or not client's configuration data is located in the selected configuration server node;

f) if it is determined that said data is located in the selected configuration server node, transmitting said ready-to-accept message to the configuration client node; and g) if it is determined that said data is not located in the second configuration server node, selecting, at the first configuration server node, a further configuration server node and transmitting a change-server message to the client node, and returning to the step (d).

13. A node configuration setup method for a connection-oriented network, wherein a configuration client node is responsive to a ready-to-accept message from one of a plurality of configuration server nodes for downloading client's configuration data therefrom, comprising:

a) determining, at a first configuration server node in response to an initial configuration inquiry message from said client node, whether or not said data is located in the first configuration server node;

b) if it is determined that said data is located in the first configuration server node, transmitting said ready-to-accept message from the first configuration server node to the client node;

c) if it is determined that said data is not located in the first configuration server node, selecting, at the first configuration server node, a second configuration server node;

d) transmitting a forward-transfer request message from the first configuration server node to the selected configuration server node;

e) determining, at the selected configuration server node in response to the forward-transfer request message, whether or not said data is located in the selected configuration server node;

f) if it is determined that said data is located in the selected configuration server node, transmitting said data from the selected configuration server node to the first configuration server node and transmitting said ready-to-accept message from the first configuration server node to the client node; and g) if it is determined that said data is not located in the selected configuration server node, selecting, at the first configuration server node, a further configuration server node and returning to the step (d).

14. A node configuration setup method for a connection-oriented network, wherein a configuration client node is responsive to a ready-to-accept message from one of a plurality of configuration server nodes for downloading client's configuration data therefrom, comprising:

a) determining, at a first configuration server node in response to an initial configuration inquiry message from the client node, whether or not said data is located in the first configuration server node;

b) if it is determined that said data is located in the first configuration server node, transmitting said ready-to-accept message from the first configuration server node to the client node;

c) if it is determined that said data is not located in the first configuration server node, selecting, at the first configuration server node, a second configuration server node;

d) transmitting a forward-transfer request message from the first configuration server node to the selected configuration server node;

e) determining, at the selected configuration server node in response to the forward-transfer request message, whether or not said data is located in the selected configuration server node;

f) if it is determined that said data is located in the selected configuration server node, transmitting said data from the selected configuration server node to the first configuration server node and transmitting said ready-to-accept message from the first configuration server node to the client node;

g) if it is determined that said data is not located in the selected configuration server node, selecting, at the selected configuration server node, a further configuration server node and transmitting a reply message from the previously selected configuration server node to the first configuration server node; and h) transmitting, in response to the reply message, a forward-transfer request message from the first configuration server node to the configuration server node selected by the step (g), and returning to the step (e).

15. A node configuration setup method for a connection-oriented network, wherein a configuration client node is responsive to a ready-to-accept message from one of a plurality of configuration server nodes for downloading client's configuration data therefrom, comprising:

a) determining, at a first configuration server node in response to an initial configuration inquiry message from said client node, whether or not said data is located in the first configuration server node;

b) if it is determined that said data is located in the first configuration server node, transmitting said ready-to-accept message from the first configuration server node to the client node;

c) if it is determined that said data is not located in the first configuration server node, selecting, at the first configuration server node, a second configuration server node;

d) transmitting a direct-transfer request message from the first configuration server node to the selected configuration server node;

e) determining, at the selected configuration server node in response to the direct-transfer request message, whether or not said data is located in the selected configuration server node;

f) if it is determined that said data is located in the selected configuration server node, transmitting said ready-to-accept message from the selected configuration server node to the client node; and g) if it is determined that said data is not located in the selected configuration server node, selecting, at the first configuration server node, a further configuration server node and returning to the step (d).

16. The method of claim 12, 13 or 15, wherein the step (g) comprises:

determining, at the first configuration server node, a name of said further configuration server node;

transmitting said name from the first configuration server node to a name system server; and receiving, at the first configuration server node, address information of the further configuration server node from the name system server.

17. A node configuration setup method for a connection-oriented oriented network, wherein a configuration client node is responsive to a ready-to-accept message from one of a plurality of configuration server nodes for downloading client's configuration data therefrom, comprising:

a) determining, at a first configuration server node in response to an initial configuration inquiry message from said client node, whether or not said data is located in the first configuration server node;

b) if it is determined that said data is located in the first configuration server node, transmitting said ready-to-accept message from the first configuration server node to the client node;

c) if it is determined that said data is not located in the first configuration server node, selecting, at the first configuration server node, a second configuration server node;

d) transmitting a direct-transfer request message from the first configuration server node to the selected configuration server node;

e) determining, at the selected configuration server node in response to the direct-transfer request message, whether or not said data is located in the selected configuration server node;

f) if it is determined that said data is located in the selected configuration server node, transmitting said ready-to-accept message from the selected configuration server node to the client node;

g) if it is determined that said data is not located in the selected configuration server node, selecting, at the selected configuration server node, a further configuration server node and transmitting a reply message from the previously selected configuration server node to the first configuration server node; and h) transmitting, in response to the reply message, a direct-transfer request message from the first configuration server node to the configuration server node selected by the step (g), and returning to the step (e).

18. The method of claim, 12, 13, 14, 15 or 17, wherein the step (c) comprises:

determining, at the first configuration server node, a name of said second configuration server node;

transmitting said name from the first configuration server node to a name system server; and receiving, at the first configuration server node, address information of the second configuration server node from the name system server.

19. The method of claim 14 or 17, wherein the step (g) comprises:

determining, at the selected configuration server node, a name of said further configuration server node;

transmitting said name from the selected configuration server node to a name system server; and receiving, at the selected configuration server node, address information of the further configuration server node from the name system server.

* * * * *